(12) United States Patent
Goldstein et al.

(10) Patent No.: US 12,512,943 B2
(45) Date of Patent: Dec. 30, 2025

(54) CONSECUTIVE SLOT SCHEDULING FOR PHYSICAL UPLINK SHARED CHANNEL RESOURCES

(71) Applicant: Dell Products L.P., Round Rock, TX (US)

(72) Inventors: Eran Goldstein, Montreal (CA); Kazem Izadinasab, Kitchener (CA); Mohammed Abdelsadek, Kanata (CA); Jayaram Venguduswamy Srinivasan, Nepean (CA)

(73) Assignee: DELL PRODUCTS L.P., Round Rock, TX (US)

( * ) Notice: Subject to any disclaimer, the term of this patent is extended or adjusted under 35 U.S.C. 154(b) by 391 days.

(21) Appl. No.: 18/352,438

(22) Filed: Jul. 14, 2023

(65) Prior Publication Data

US 2025/0023693 A1     Jan. 16, 2025

(51) Int. Cl.
*H04L 5/00* (2006.01)
(52) U.S. Cl.
CPC .......... *H04L 5/0051* (2013.01); *H04L 5/0007* (2013.01)
(58) Field of Classification Search
None
See application file for complete search history.

(56) References Cited

U.S. PATENT DOCUMENTS

2023/0216712 A1* 7/2023 Yao .................... H04L 25/0228

FOREIGN PATENT DOCUMENTS

WO   WO-2022031617 A1 *  2/2022  ........... H04L 5/1469
WO   WO-2022151906 A1 *  7/2022  ......... H04L 25/0202

OTHER PUBLICATIONS

International Search Report and Written Opinion received for PCT Application Serial No. PCT/US2023/036212 dated Mar. 27, 2024, 16 pages.
Interdigital Inc., "Pusch Coverage Enhancements", 3GPP TSG RAN WG1 #103-e, R1- 2009583, Nov. 8, 2020, 19 pages.
VIVO, "Discussion on Joint Channel Estimation for PUSCH", 3GPP TSG RAN WG1 #105-e, R1-2104378, May 11, 2021, 12 pages.
3GPP "5G; NR; Physical channels and modulation (3GPP TS 38.211 version 15.8.0 Release 15)" 3GPP, Jan. 2020 100 pages.
3GPP "5G; NR; Physical layer procedures for control (3GPP TS 38.213 version 16.2.0 Release 16)" 3GPP, Jul. 2020, 180 pages.

* cited by examiner

*Primary Examiner* — Luna Weissberger
(74) *Attorney, Agent, or Firm* — Amin, Turocy & Watson, LLP (57) ABSTRACT

Consecutive slot scheduling for physical uplink shared channel resources (e.g., using a computerized tool), is enabled. For example, a system can comprise: a processor and a memory that stores executable instructions that, when executed by the processor, facilitate performance of operations, comprising: determining a first demodulation reference signal of a special slot of a physical uplink shared channel, and based on the first demodulation reference signal, scheduling a second demodulation reference signal of a subsequent slot of the physical uplink shared channel, subsequent to the special slot, for uplink transmission via a user equipment common to the special slot and the subsequent slot.

20 Claims, 10 Drawing Sheets

CONSECUTIVE SLOT SCHEDULING FOR PHYSICAL UPLINK SHARED CHANNEL RESOURCES

BACKGROUND

In new radio (NR) systems, similar to long term evolution (LTE) systems, a slot can be considered for both downlink (DL) and uplink (UL) transmissions. For the UL, physical uplink shared channel (PUSCH) demodulation reference signals (DMRSs) are used for PUSCH channel estimation, which in turn is utilized for decoding UL data.

In a special slot, the duration of scheduled PUSCH resources for PUSCH transmission is limited. Therefore, for a special slot, the PUSCH DMRS and DMRS additional positions are limited to one or two. Such a limited number of PUSCH DMRSs can result in poor channel estimation and degrade the system's performance.

The above-described background relating to PUSCH channel estimation is merely intended to provide a contextual overview of some current issues and is not intended to be exhaustive. Other contextual information may become further apparent upon review of the following detailed description.

DETAILED DESCRIPTION

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

As alluded to above, channel estimation can be improved in various ways, and various embodiments are described herein to this end and/or other ends. The disclosed subject matter relates to telecommunications and, more particularly, to consecutive slot scheduling for physical uplink shared channel resources.

According to an embodiment, a system can comprise a processor, and a memory that stores executable instructions that, when executed by the processor, facilitate performance of operations, comprising determining a first demodulation reference signal of a special slot of a physical uplink shared channel, and based on the first demodulation reference signal, scheduling a second demodulation reference signal of a subsequent slot of the physical uplink shared channel, subsequent to the special slot, for uplink transmission via a user equipment common to the special slot and the subsequent slot.

In various embodiments, the first demodulation reference signal and the second demodulation reference signal can comprise a common frequency. In further embodiments, the first demodulation reference signal and the second demodulation reference signal can comprise a common transmit power. In additional embodiments, the first demodulation reference signal and the second demodulation reference signal can comprise a common antenna. In yet further embodiments, the first demodulation reference signal and the second demodulation reference signal can comprise a common time alignment.

In various embodiments, the second demodulation reference signal can be utilized for channel estimation applicable to the special slot. In further embodiments, the second demodulation reference signal can comprise a sequentially-first orthogonal frequency division multiplexing symbol of the subsequent slot. In additional embodiments, the second demodulation reference signal comprises a sequentially third or fourth orthogonal frequency division multiplexing symbol of the subsequent slot.

In various embodiments, the above operations can further comprise, in response to a determination that a gNodeB comprises layer one and layer two unit separation, sending, to a layer one receiver, an indication that the subsequent slot is able to be utilized for channel estimation for the user equipment.

In various embodiments, the above operations can further comprise, in response to a determination that a gNodeB comprises layer one and layer two unit separation comprising a layer one receiver and a layer two receiver, modifying a latency limit of the layer two receiver, applicable to the layer one receiver, to be able to perform processing associated with the special slot.

In another embodiment, a non-transitory machine-readable medium can comprise executable instructions that, when executed by a processor, facilitate performance of operations, comprising determining a first demodulation reference signal of a special slot of a physical uplink shared channel and based on the first demodulation reference signal, scheduling a second demodulation reference signal of a subsequent slot of the physical uplink shared channel, subsequent to the special slot, for uplink transmission via a user equipment common to the special slot and the subsequent slot.

In various embodiments, the first demodulation reference signal and the second demodulation reference signal can comprise a common frequency. In further embodiments, the first demodulation reference signal and the second demodulation reference signal can comprise a common transmit power. In additional embodiments, the first demodulation reference signal and the second demodulation reference signal can comprise a common antenna. In yet further embodiments, the first demodulation reference signal and the second demodulation reference signal can comprise a common time alignment.

In various embodiments, the second demodulation reference signal can be utilized for channel estimation applicable to the special slot. In further embodiments, the first demodulation reference signal can be utilized for channel estimation applicable to the special slot.

According to yet another embodiment, a method can comprise determining, by network equipment comprising a processor, a first demodulation reference signal of a special slot of a physical uplink shared channel, and based on the first demodulation reference signal, scheduling, by the network equipment, a second demodulation reference signal of a subsequent slot of the physical uplink shared channel, subsequent to the special slot, for uplink transmission via a user equipment common to the special slot and the subsequent slot.

In various embodiments, the second demodulation reference signal can comprise a sequentially-first orthogonal frequency division multiplexing symbol of the subsequent slot.

In various embodiments, the above method can further comprise, in response to a determination that a gNodeB comprises layer one and layer two unit separation, sending, by the network equipment to a layer one receiver, an indication that the subsequent slot comprises a capability to be utilized for channel estimation for the user equipment.

In various embodiments, the above method can further comprise, in response to a determination that a gNodeB comprises layer one and layer two unit separation comprising a layer one receiver and a layer two receiver, modifying, by the network equipment, a latency limit of the layer two receiver, applicable to the layer one receiver, to be usable for processing associated with the special slot.

It should be appreciated that additional manifestations, configurations, implementations, protocols, etc. can be utilized in connection with the following components described herein or different/additional components as would be appreciated by one skilled in the art.

Various embodiments herein comprise scheduling a subsequent slot (e.g., a UL slot) after a special slot for UL transmission for the same UE (e.g., using the same allocation configuration in terms of antennas and used resource blocks) and/or utilizing the first DMRS symbol of the subsequent slot for channel estimation of the special slot.

It is noted that embodiments herein can be applicable to time-division duplexing (TDD) and/or frequency-division duplexing (FDD) systems. In FDD (as in TDD) any PUSCH could be allocated a low number of symbols and therefore suffer from performance degradation as the number of DMRS symbols is reduced.

Figure 1:
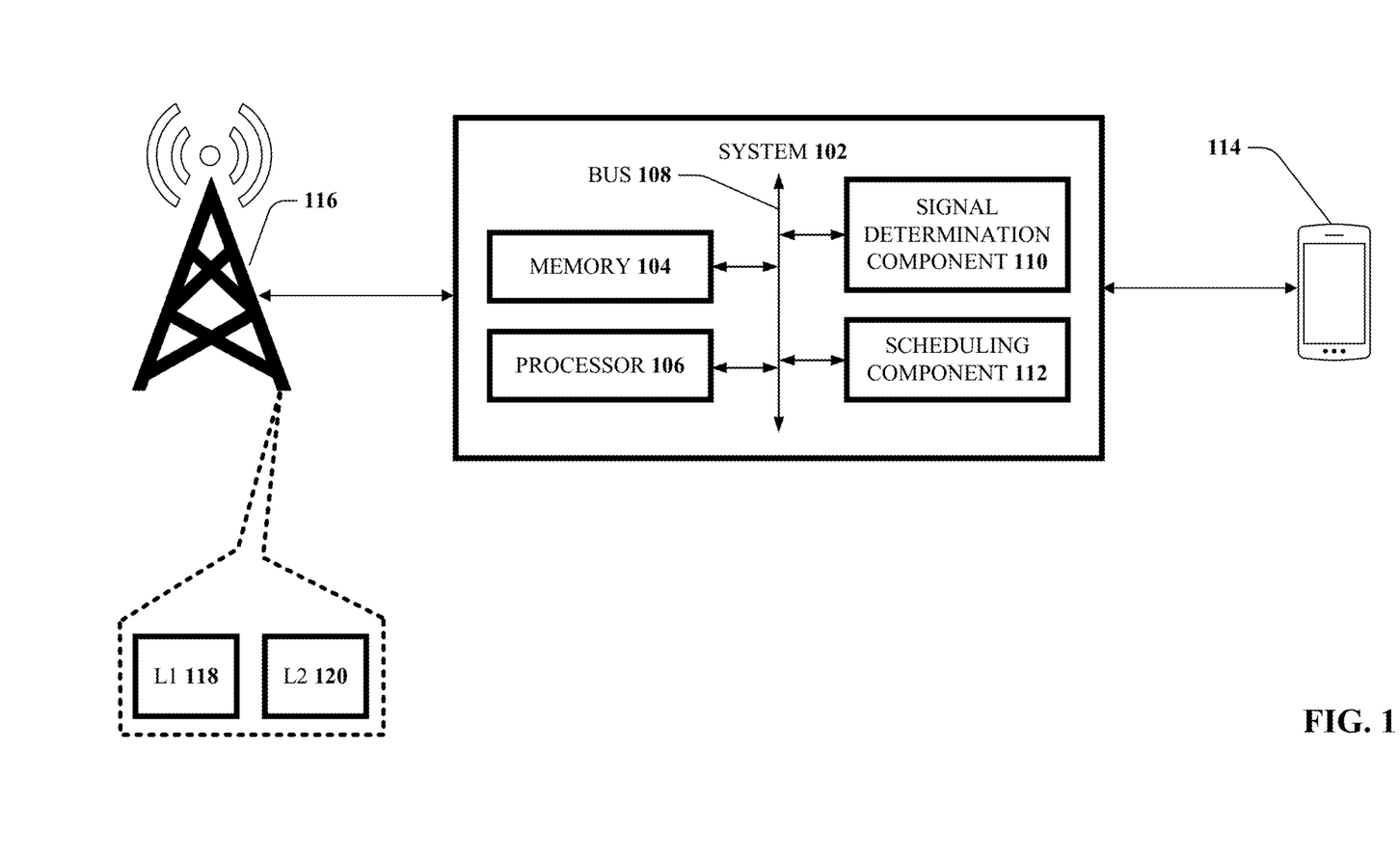
FIG. 1 is a block diagram of an exemplary system in accordance with one or more embodiments described herein.

Turning now to FIG. 1, there is illustrated an example, non-limiting system 102 in accordance with one or more embodiments herein. System 102 can comprise a computerized tool, which can be configured to perform various operations relating to consecutive slot scheduling. The system 102 can comprise one or more of a variety of components, such as memory 104, processor 106, bus 108, signal determination component 110, and/or scheduling component 112. In various embodiments, the system 102 can be communicatively coupled to, or can further comprise, user equipment (UE) 114 (e.g., a mobile device) and/or gNodeB 116. In various embodiments, one or more of the memory 104, processor 106, bus 108, signal determination component 110, scheduling component 112, UE 114, and/or gNodeB 116 can be communicatively or operably coupled (e.g., over a bus or wireless network) to one another to perform one or more functions of the system 102.

Figure 5:
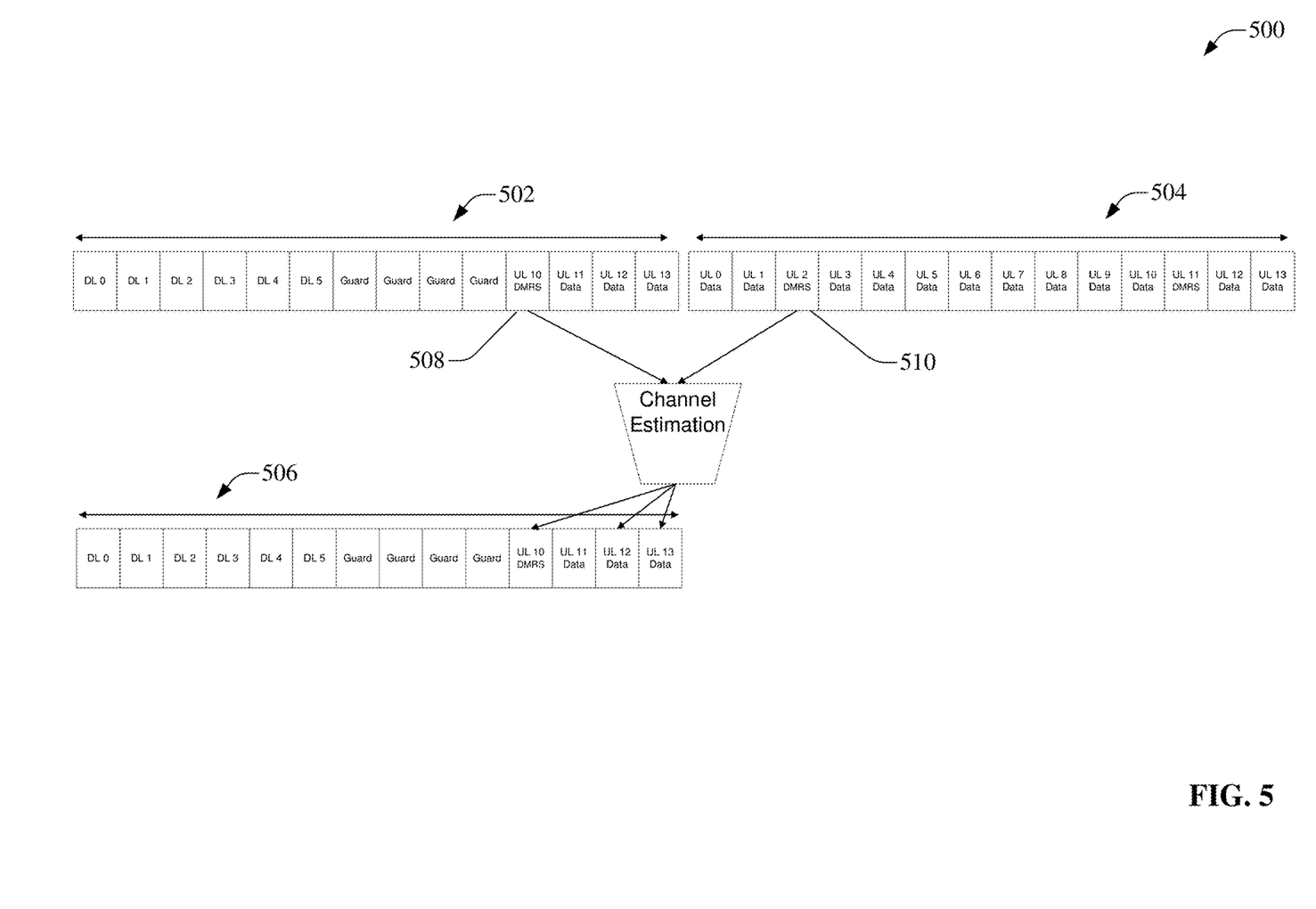
FIG. 5 is a diagram of exemplary slots and channel estimation in accordance with one or more embodiments described herein.
Figure 6:
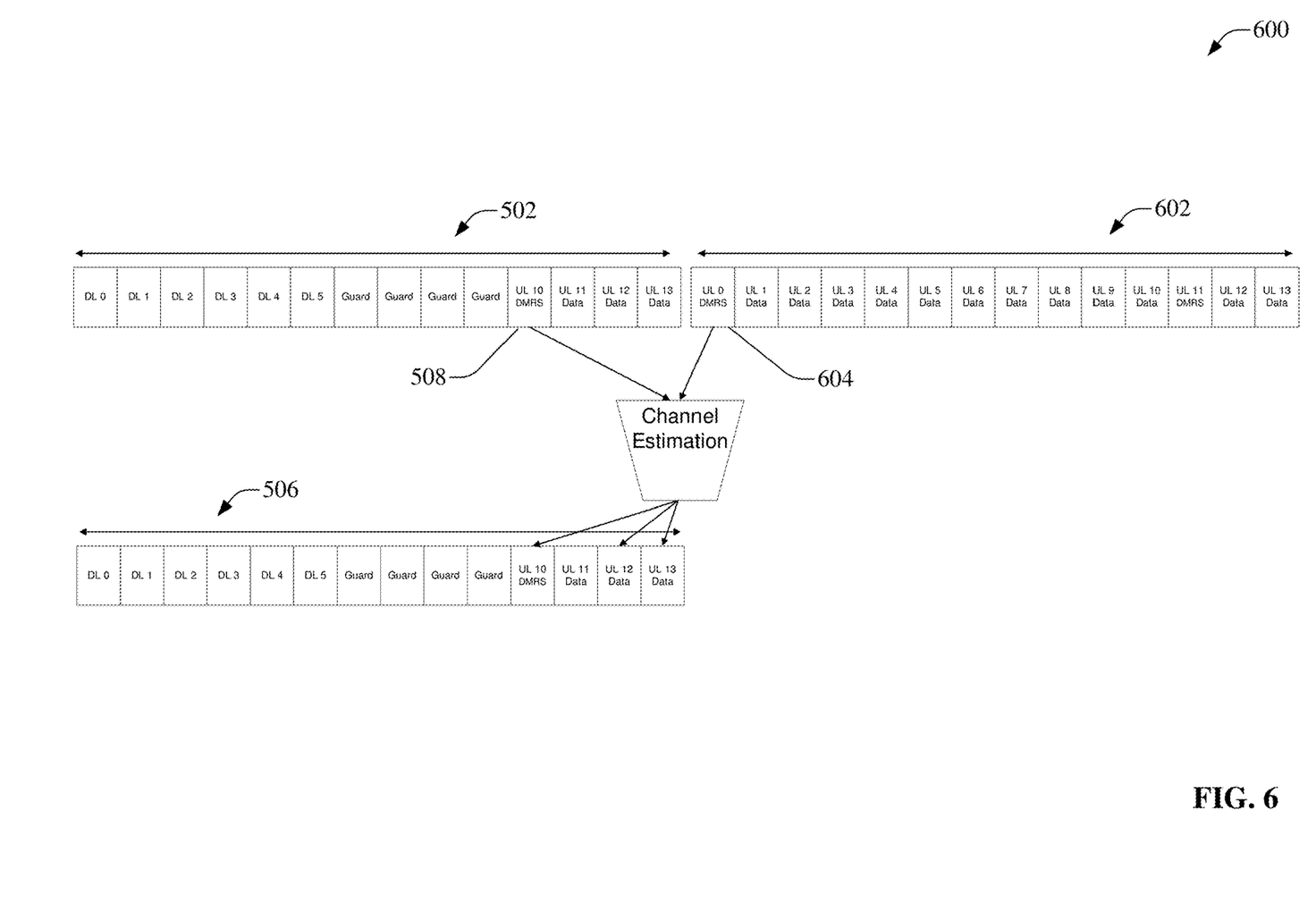
FIG. 6 is a diagram of exemplary slots and channel estimation in accordance with one or more embodiments described herein.

According to an embodiment, the signal determination component 110 can determine a first demodulation reference signal (DMRS) (e.g., 508) of a special slot (e.g., special slot 502) of a physical uplink shared channel. It is noted that a DMRS can comprise a reference signal utilized for channel estimation (e.g., via channel estimation component 204 as later discussed in greater detail). The scheduling component 112 can then, based on the first demodulation reference signal, schedule a second demodulation reference signal (e.g., 510 or 604) of a subsequent slot (e.g., UL slot 504) of the physical uplink shared channel, subsequent to the special slot, for uplink transmission via a user equipment (e.g., UE 114) common to the special slot 502 and the subsequent slot 504.

In various embodiments, the first demodulation reference signal (e.g., 508) and the second demodulation reference signal (e.g., 510 or 604) can comprise a common frequency. In further embodiments, the first demodulation reference signal and the second demodulation reference signal can comprise a common transmit power. In additional embodiments, the first demodulation reference signal and the second demodulation reference signal can utilize a common antenna (e.g., of the gNodeB 116). In yet further embodiments, the first demodulation reference signal and the second demodulation reference signal can comprise a common time alignment. In this regard, the UE 114, when signaled, refrains from updating its RF frequency, time alignment, and/or power control loop, and can use the same antenna precoding.

Figure 2:
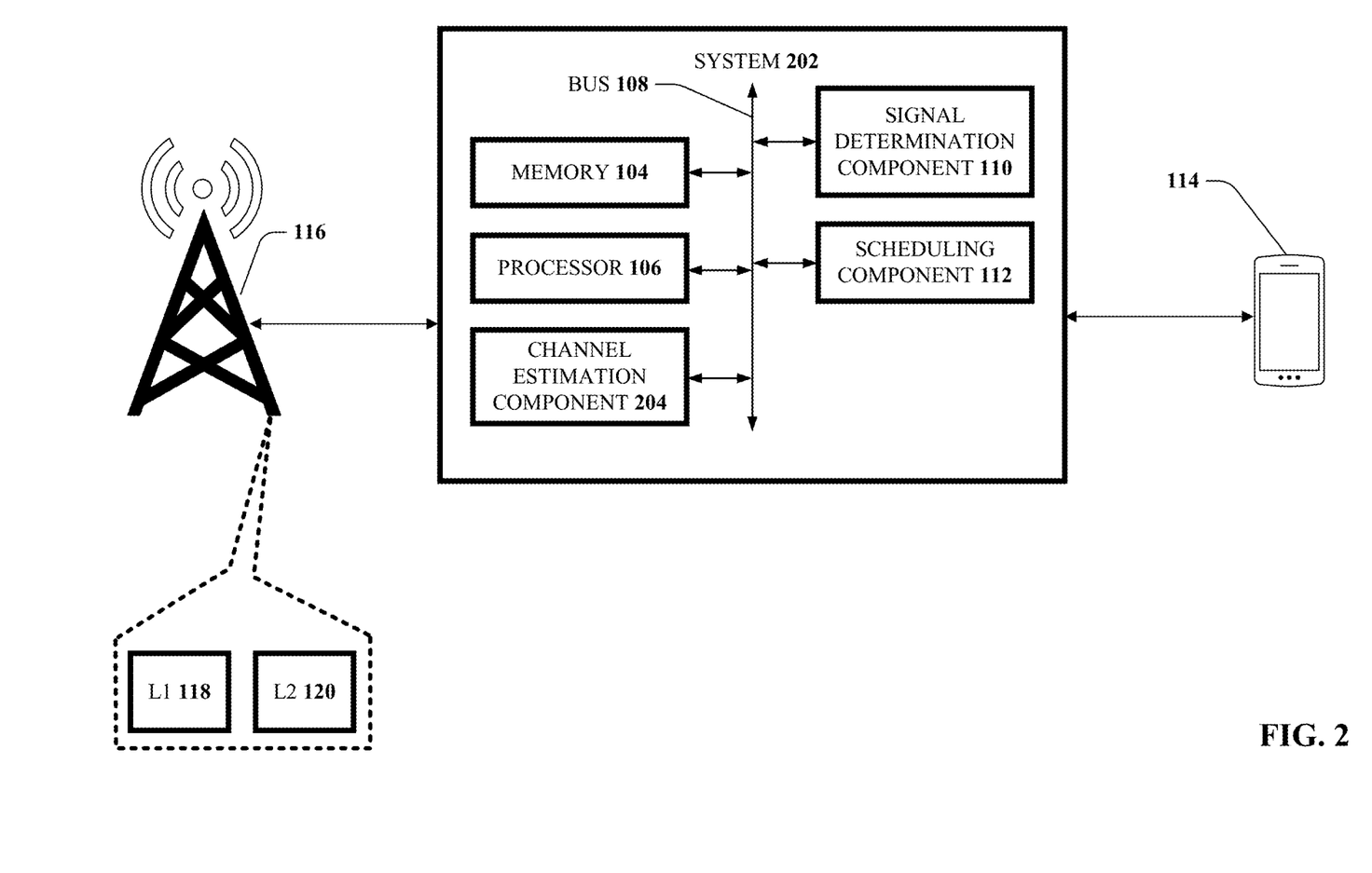
FIG. 2 is a block diagram of an exemplary system in accordance with one or more embodiments described herein.

Turning now to FIG. 2, there is illustrated an example, non-limiting system 202 in accordance with one or more embodiments herein. System 202 can comprise a computerized tool, which can be configured to perform various operations relating to consecutive slot scheduling. The system 202 can be similar to system 102, and can comprise one or more of a variety of components, such as memory 104, processor 106, bus 108, signal determination component 110 and/or scheduling component 112. In various embodiments, the system 202 can be communicatively coupled to, or can further comprise, UE 114 and/or gNodeB 116. The system 202 can further comprise a channel estimation component 204. In various embodiments, one or more of the memory 104, processor 106, bus 108, signal determination component 110, scheduling component 112, UE 114, gNodeB 116, and/or channel estimation component 204 can be communicatively or operably coupled (e.g., over a bus or wireless network) to one another to perform one or more functions of the system 202.

In various embodiments, a second demodulation reference signal (e.g., 510 or 604) herein can be utilized (e.g., via the channel estimation component 204) for channel estimation applicable to the special slot 502. In additional embodiments, the second demodulation reference signal can comprise a sequentially third or fourth orthogonal frequency division multiplexing symbol (e.g., 510) of the subsequent slot (e.g., UL slot 504). In this regard, see FIG. 5, in which there is illustrated a diagram 500 of exemplary slots and channel estimation in accordance with one or more embodiments described herein. Diagram 500 depicts special slot 502, UL slot 504 (e.g., a subsequent slot), and processing (e.g., equalizing) data 506. In diagram 500, the second demodulation reference signal (e.g., 510) can comprise a sequentially third or fourth orthogonal frequency division multiplexing symbol of the UL slot 504 (in diagram 500, the second demodulation reference signal (e.g., 510) is in the sequentially third position, though it is not so limited). In further embodiments, the second demodulation reference signal can comprise a sequentially-first orthogonal frequency division multiplexing symbol (e.g., 604) of the subsequent slot. In this regard, see FIG. 6, in which there is illustrated a diagram 600 of exemplary slots and channel estimation in accordance with one or more embodiments described herein. It is noted that diagram 600 is similar to diagram 500. However, in diagram 600, the second demodulation reference signal can comprise a sequentially-first orthogonal frequency division multiplexing symbol of the UL slot 602. In various embodiments herein, the scheduling component 112 can schedule the subsequent slot (e.g., UL slot 504) after the special slot 502 for UL transmission of the same UE 114, using the same allocation configuration in terms of antennas and used RBs (resource blocks). As a result, the PUSCH DMRSs of the subsequent slot (e.g., UL slot 504) can be utilized for the channel estimation (e.g., via the channel estimation component 204) of the special slot 502, in which the channel estimation component 204 can determine various channel state information applicable to a communication link associated with the UE 114.

It is noted that, in general in 5G, a PUSCH transmission can comprise between one and four occurrences of DMRS occasions in the slot. Therefore embodiments herein are not limited to two DMRS symbols, and such depictions herein are purely exemplary. Embodiments herein can utilize DMRS from two or more consecutive slots. Further, embodiments herein are not limited to channel estimation of a special slot. Further embodiments can comprise channel estimation of other suitable slots in accordance with various embodiments herein, such as UL and/or DL slots. Other suitable combinations and/or implementations are envisaged.

It is additionally noted that embodiments herein can be applicable to both DL and UL data channels-PUSCH and physical downlink shared channel (PDSCH), in a symmetric way, for the UE 114 and base station side (e.g., a system herein and/or gNodeB 116).

Figure 3:
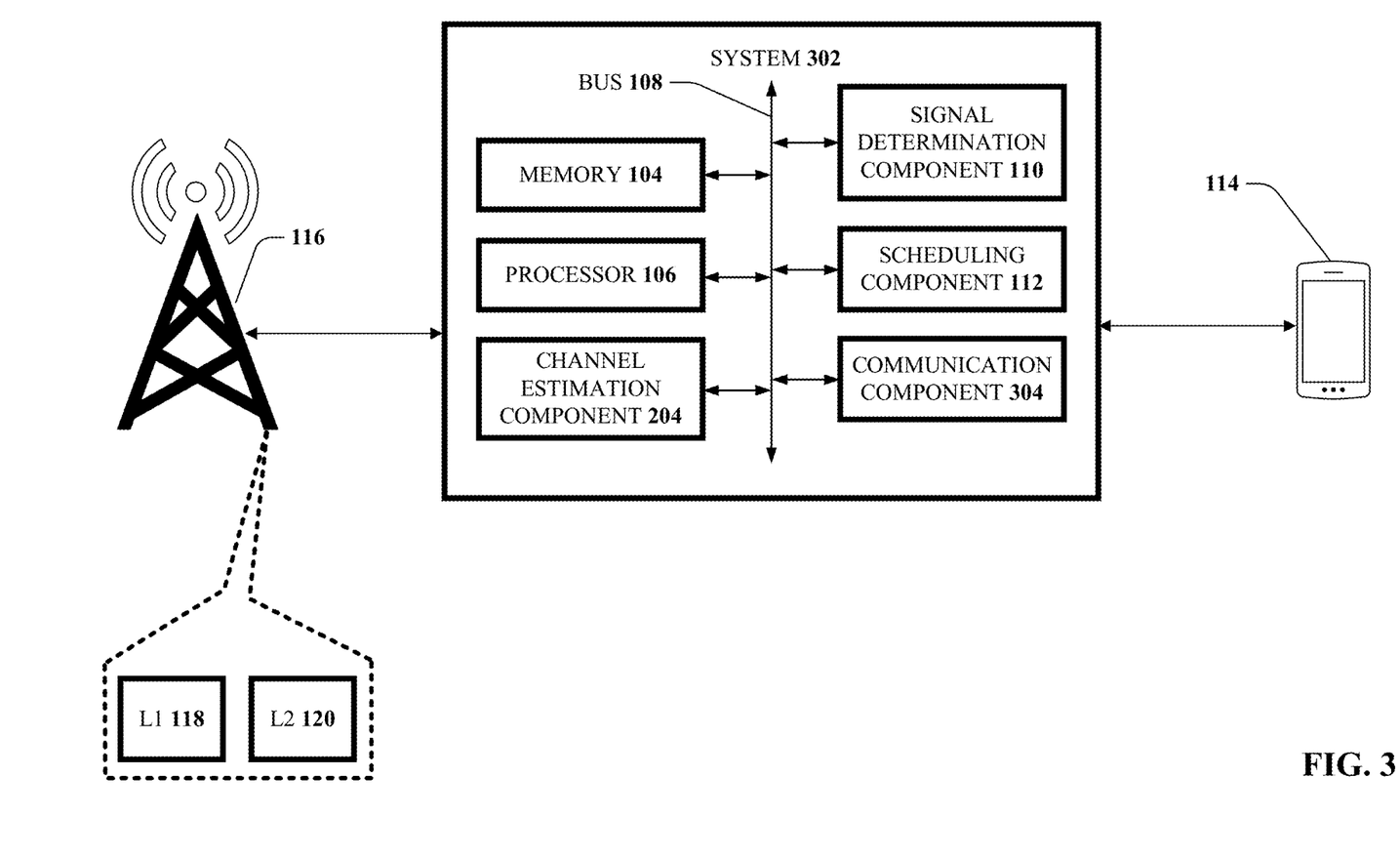
FIG. 3 is a block diagram of an exemplary system in accordance with one or more embodiments described herein.

Turning now to FIG. 3, there is illustrated an example, non-limiting system 302 in accordance with one or more embodiments herein. System 302 can comprise a computerized tool, which can be configured to perform various operations relating to consecutive slot scheduling. The system 302 can be similar to system 202, and can comprise one or more of a variety of components, such as memory 104, processor 106, bus 108, signal determination component 110 scheduling component 112, and/or channel estimation component 204. In various embodiments, the system 302 can be communicatively coupled to, or can further comprise, UE 114 and/or gNodeB 116. The system 302 can further comprise a communication component 304. In various embodiments, one or more of the memory 104, processor 106, bus 108, signal determination component 110, scheduling component 112, UE 114, gNodeB 116 channel estimation component 204, and/or communication component 304 can be communicatively or operably coupled (e.g., over a bus or wireless network) to one another to perform one or more functions of the system 302.

In various embodiments, the communication component 304 can, in response to a determination (e.g., via the signal determination component 110 or another suitable component or system herein) that the gNodeB 116 comprises layer one and layer two unit separation (e.g., L1 118 and L2 120), send, to a layer one receiver (e.g., L1 118), an indication that the subsequent slot (e.g., UL slot 504) is able to be utilized for channel estimation (e.g., via the channel estimation component 204) for the UE 114. The foregoing can enable the channel estimation component 204 to utilize the UL slot 504 in channel estimation for the special slot 502 herein. It is noted that the communication component 304 can comprise the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.)

Figure 4:
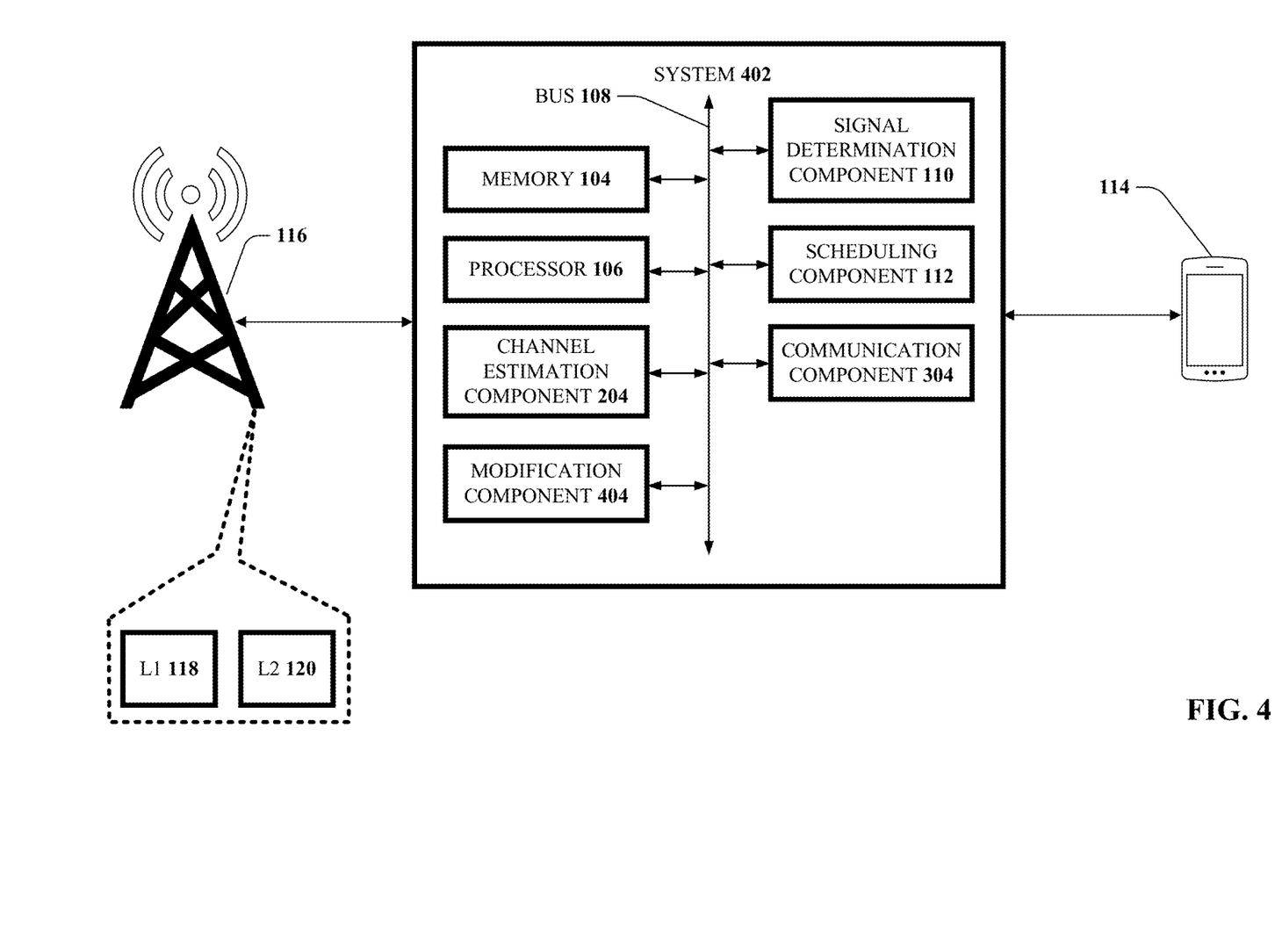
FIG. 4 is a block diagram of an exemplary system in accordance with one or more embodiments described herein.

Turning now to FIG. 4, there is illustrated an example, non-limiting system 402 in accordance with one or more embodiments herein. System 402 can comprise a computerized tool, which can be configured to perform various operations relating to consecutive slot scheduling. The system 402 can be similar to system 302, and can comprise one or more of a variety of components, such as memory 104, processor 106, bus 108, signal determination component 110 scheduling component 112, channel estimation component 204, and/or communication component 304. In various embodiments, the system 402 can be communicatively coupled to, or can further comprise, UE 114 and/or gNodeB 116. The system 402 can further comprise a modification component 404. In various embodiments, one or more of the memory 104, processor 106, bus 108, signal determination component 110, scheduling component 112, UE 114, gNodeB 116, channel estimation component 204, communication component 304, and/or modification component 404 can be communicatively or operably coupled (e.g., over a bus or wireless network) to one another to perform one or more functions of the system 402.

Figure 7:
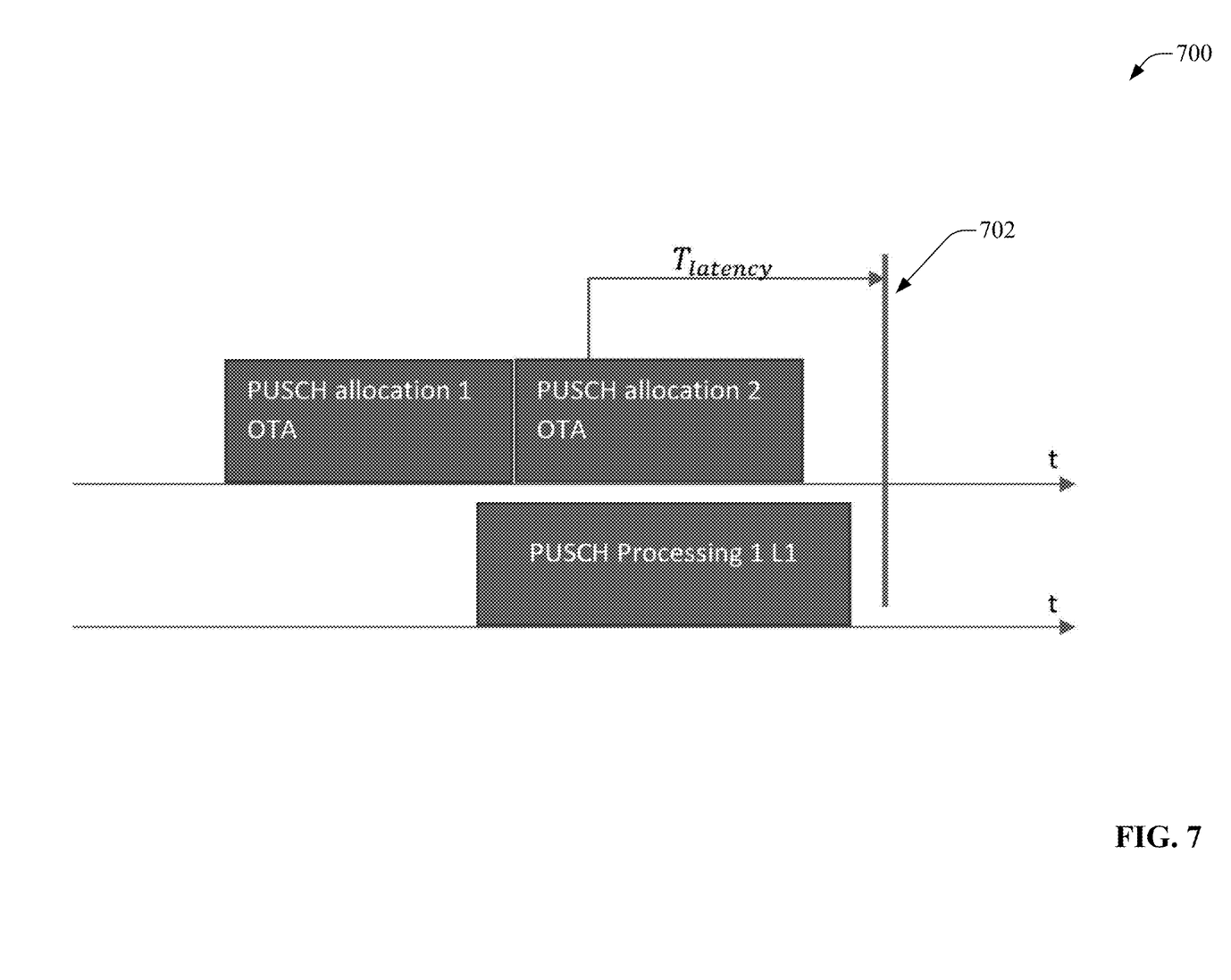
FIG. 7 is a diagram of a latency budget in accordance with one or more embodiments described herein.

In various embodiments, the modification component 404 can, in response to a determination that a gNodeB comprises layer one and layer two unit separation comprising a layer one receiver (e.g., L1 118) and a layer two receiver (e.g., L2 120), modify a latency limit of the layer two receiver (e.g., L2 120), applicable to the layer one receiver (e.g., L1 118), to be able to perform processing associated with the special slot 502. Such a modification can comprise an increase or decrease in a defined latency limit corresponding to a defined latency budget. In an example, see FIG. 7, in which a diagram 700 of a latency budget is depicted in accordance with one or more embodiments described herein. In diagram 700, $T_{latency}$ latency allows to L1 118 to normally process. However, in diagram 700, the starting point is at the second allocation first DMRS symbol (e.g., 510 or 604). In diagram 700, 702 can comprise the deadline for L1 118 sending decoded PUSCH to L2 120.

Embodiments herein address potential degradation in the channel estimation of the special slots, for instance, by scheduling the subsequent slot (e.g., UL slot 504) for UL transmission of the same UE 114. A network gNodeB 116 (e.g., via L2 120) can schedule (e.g., via the scheduling component 112) the same UE 114 to transmit on the subsequent slot (e.g., UL slot 504) starting at first the orthogonal frequency division multiplexing (OFDM) symbols, for instance, to have the first DMRS at symbol index 0, 1, 2, or 3 (see FIGS. 5 and 6). The next slot allocation can comprise the same number of RBs (or more) and/or can comprise at least the same set of RBs that were used on the first slot. Likewise, the allocation can utilize the same antenna precoding on both slots. In the case where the UE 114 does not need to be scheduled on the subsequent slot, the L2 120 and/or scheduling component 112 can schedule the UE 114 in the special slot 502 to use a fraction of its resources to send a fraction of the data, then the remaining data can be transmitted (e.g., via the communication component 304) in the subsequent UL slot 504 by scheduling (e.g., via the scheduling component 112) the same UE 114 in the subsequent slot (e.g., UL slot 504). For example, splitting the number of original number of RBs N in two results in N/2 over the first slot and the other N/2 in the next. As a result, the PUSCH DMRSs of the subsequent slot (e.g., UL slot 504) can be utilized for the channel estimation (e.g., via the channel estimation component 204) of the special slot 502.

It is noted that next-slot channel estimation for a given UE 114 can benefit from a previous DMRS symbol in a case in which the subsequent slot (e.g., UL slot 504) comprises only one DMRS, for instance, due to a low number of symbols in the allocation. In this case, receiver performance can increase with a cleaner channel estimation. It is additionally noted that special handling can be performed (e.g., via a system herein) in a scenario in which the UE 114 does not comprise enough data for transmission in two consecutive slots. In such a case, even if the UE 114's RBs are limited by a scheduler (e.g., scheduling component 112) for the special slot 502, the UL resources in the special slots can be sufficient for the UE 114 to send its data. In this case, the subsequent UL slot is not scheduled by the scheduler (e.g., scheduling component 112) for the same UE 114.

In cases in which the gNodeB 116 is comprised of separated L1/L2 units (e.g., L1 118 and L2 120), a special signal can be utilized (e.g., via the communication component 304) to notify the L1 receiver 118 that the next slot can also be used for channel estimation for that UE 114. It is noted that the L1 118 is normally expected to send the decoded block back to L2 120, at most at a given time T, after the end of the slot over the air (OTA). However, in various embodiments herein, L2 120 can expect and/or permit a higher latency for L1 118 for the processing of the special slot 502, comprising of the additional time until the arrival of the first DMRS of the subsequent slot (e.g., UL slot 504). This processing delay can depend, for instance, on the mapping type for resource allocation of the subsequent slot after the special slot. In some embodiments, Mapping Type B is the only choice for the special slot 502, and consequently, the DMRS is at the beginning of PUSCH resource allocation. If it is assumed that the PUSCH resource allocation for the next slot starts from the slot boundary, there can be two exemplary cases for the processing delay depending on mapping type for the subsequent slot (e.g., UL slot 504) after the special slot 502:

Mapping Type A: For this mapping, the first DMRS is located at the third or fourth symbols ($l_0=2, 3$). Hence, embodiments herein add an extra delay of $T_{delay}=(l_d+2) \times T_{symb}$ or $T_{delay}=(l_d+3) \times T_{symb}$ depending on, for instance, whether the third or fourth symbols are used for DMRS, respectively. In this regard, $l_d$ is the duration of the allocated PUSCH for the special slot (Mapping Type B), and $T_{symb}$ is the duration of one OFDM symbol.

Mapping Type B: For this mapping, the first DMRS is located at the first symbol ($l_0=0$). In this regard, embodiments herein add an extra delay of $T_{delay}=l_d \times T_{symb}$.

Figure 8:
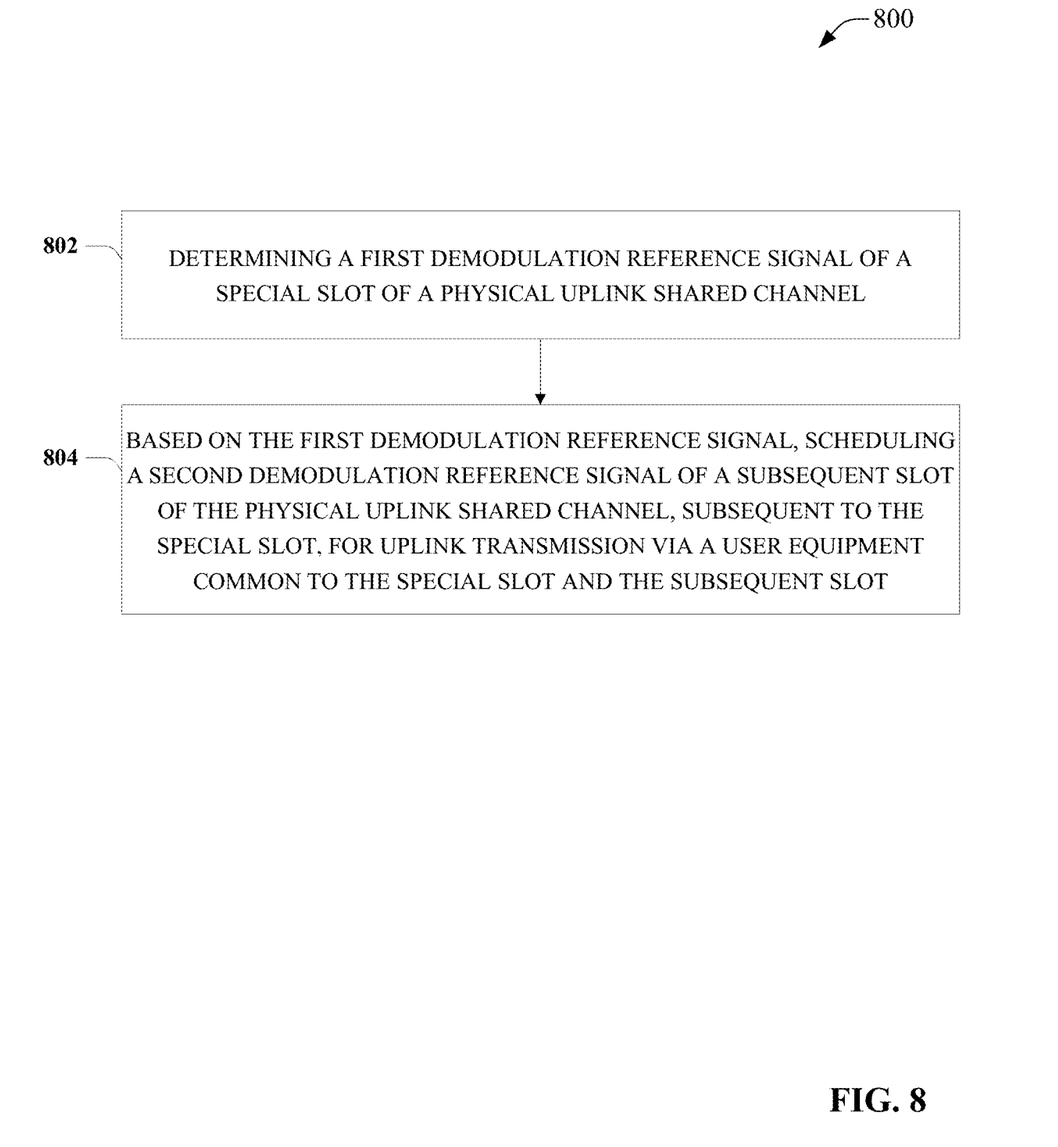
FIG. 8 is a block flow diagram for a process associated with consecutive slot scheduling in accordance with one or more embodiments described herein.

FIG. 8 illustrates a block flow diagram for a process 800 associated with consecutive slot scheduling in accordance with one or more embodiments described herein. At 802, the process 800 can comprise determining (e.g., via a signal determination component 110) a first demodulation reference signal (e.g., 508) of a special slot 502 of a physical uplink shared channel. At 804, the process 800 can comprise, based on the first demodulation reference signal, scheduling (e.g., via a scheduling component 112) a second demodulation reference signal (e.g., 510 or 604) of a subsequent slot (e.g., UL slot 504) of the physical uplink shared channel, subsequent to the special slot 502, for uplink transmission via a user equipment (e.g., UE 114) common to the special slot 502 and the subsequent slot (e.g., UL slot 504).

Figure 9:
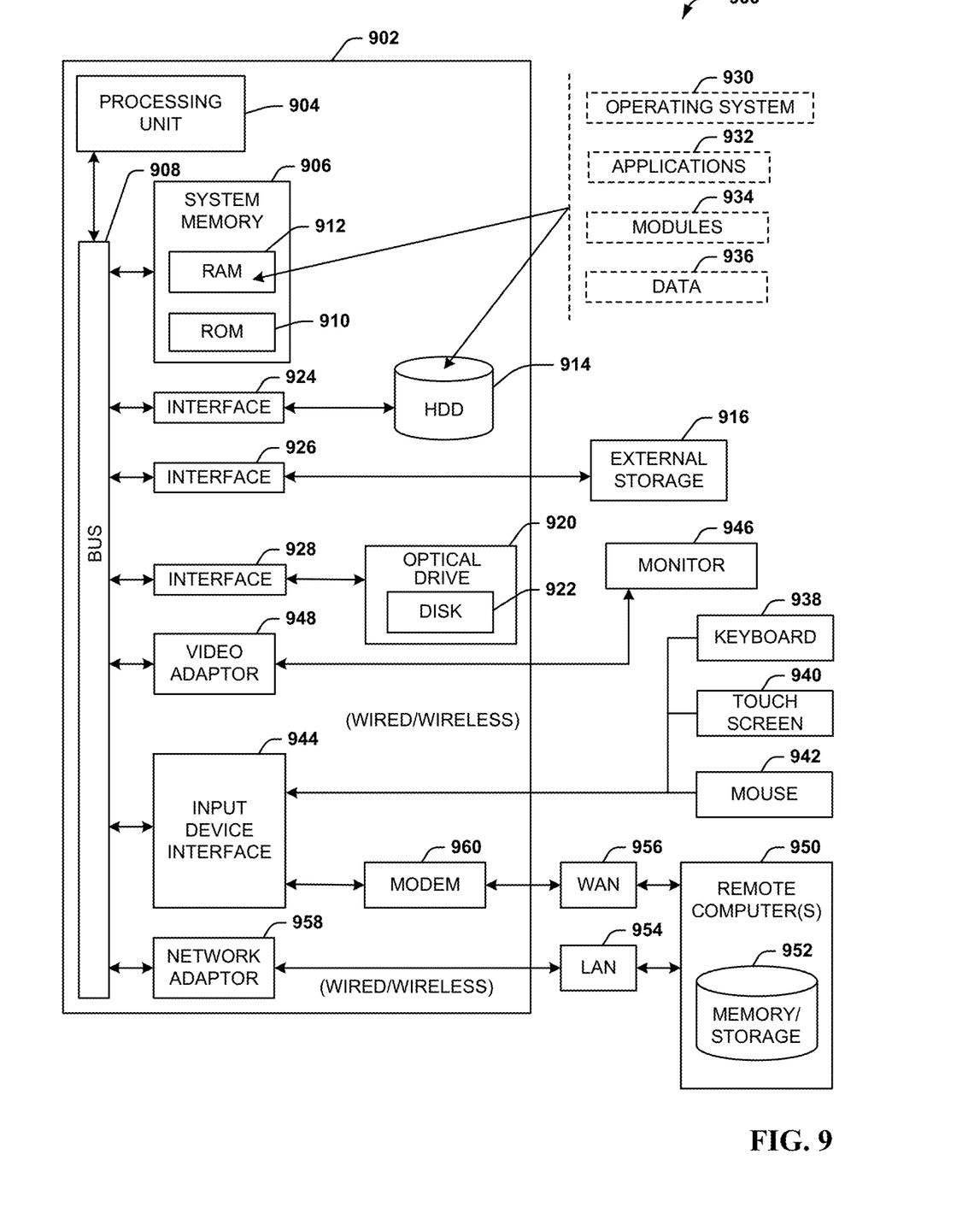
FIG. 9 is an example, non-limiting computing environment in which one or more embodiments described herein can be implemented.

In order to provide additional context for various embodiments described herein, FIG. 9 and the following discussion are intended to provide a brief, general description of a suitable computing environment 900 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory, or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries, or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared, and other wireless media.

With reference again to FIG. 9, the example environment 900 for implementing various embodiments of the aspects described herein includes a computer 902, the computer 902 including a processing unit 904, a system memory 906 and a system bus 908. The system bus 908 couples system components including, but not limited to, the system memory 906 to the processing unit 904. The processing unit 904 can be any of various commercially available processors. Dual microprocessors and other multi-processor architectures can also be employed as the processing unit 904.

The system bus 908 can be any of several types of bus structure that can further interconnect to a memory bus (with or without a memory controller), a peripheral bus, and a local bus using any of a variety of commercially available bus architectures. The system memory 906 includes ROM 910 and RAM 912. A basic input/output system (BIOS) can be stored in a non-volatile memory such as ROM, erasable programmable read only memory (EPROM), EEPROM, which BIOS contains the basic routines that help to transfer information between elements within the computer 902, such as during startup. The RAM 912 can also include a high-speed RAM such as static RAM for caching data.

The computer 902 further includes an internal hard disk drive (HDD) 914 (e.g., EIDE, SATA), one or more external storage devices 916 (e.g., a magnetic floppy disk drive (FDD) 916, a memory stick or flash drive reader, a memory card reader, etc.) and an optical disk drive 920 (e.g., which can read or write from a disk 922, such as a CD-ROM disc, a DVD, a BD, etc.). While the internal HDD 914 is illustrated as located within the computer 902, the internal HDD 914 can also be configured for external use in a suitable chassis (not shown). Additionally, while not shown in environment 900, a solid-state drive (SSD) could be used in addition to, or in place of, an HDD 914. The HDD 914, external storage device(s) 916 and optical disk drive 920 can be connected to the system bus 908 by an HDD interface 924, an external storage interface 926 and an optical drive interface 928, respectively. The interface 924 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 902, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 912, including an operating system 930, one or more application programs 932, other program modules 934 and program data 936. All or portions of the operating system, applications, modules, and/or data can also be cached in the RAM 912. The systems and methods described herein can be implemented utilizing various commercially available operating systems or combinations of operating systems.

Computer 902 can optionally comprise emulation technologies. For example, a hypervisor (not shown) or other intermediary can emulate a hardware environment for operating system 930, and the emulated hardware can optionally be different from the hardware illustrated in FIG. 9. In such an embodiment, operating system 930 can comprise one virtual machine (VM) of multiple VMs hosted at computer 902. Furthermore, operating system 930 can provide runtime environments, such as the Java runtime environment or the .NET framework, for applications 932. Runtime environments are consistent execution environments that allow applications 932 to run on any operating system that includes the runtime environment. Similarly, operating system 930 can support containers, and applications 932 can be in the form of containers, which are lightweight, standalone, executable packages of software that include, e.g., code, runtime, system tools, system libraries and settings for an application.

Further, computer 902 can be enabled with a security module, such as a trusted processing module (TPM). For instance, with a TPM, boot components hash next in time boot components, and wait for a match of results to secured values, before loading a next boot component. This process can take place at any layer in the code execution stack of computer 902, e.g., applied at the application execution level or at the operating system (OS) kernel level, thereby enabling security at any level of code execution.

A user can enter commands and information into the computer 902 through one or more wired/wireless input devices, e.g., a keyboard 938, a touch screen 940, and a pointing device, such as a mouse 942. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 904 through an input device interface 944 that can be coupled to the system bus 908, but can be connected by other interfaces, such as a parallel port, an IEEE 1394 serial port, a game port, a USB port, an IR interface, a BLUETOOTH® interface, etc.

A monitor 946 or other type of display device can be also connected to the system bus 908 via an interface, such as a video adapter 948. In addition to the monitor 946, a computer typically includes other peripheral output devices (not shown), such as speakers, printers, etc.

The computer 902 can operate in a networked environment using logical connections via wired and/or wireless communications to one or more remote computers, such as a remote computer(s) 950. The remote computer(s) 950 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 952 is illustrated. The logical connections depicted include wired/wireless connectivity to a local area network (LAN) 954 and/or larger networks, e.g., a wide area network (WAN) 956. Such LAN and WAN networking environments are commonplace in offices and companies, and facilitate enterprise-wide computer networks, such as intranets, all of which can connect to a global communications network, e.g., the Internet.

When used in a LAN networking environment, the computer 902 can be connected to the local network 954 through a wired and/or wireless communication network interface or adapter 958. The adapter 958 can facilitate wired or wireless communication to the LAN 954, which can also include a wireless access point (AP) disposed thereon for communicating with the adapter 958 in a wireless mode.

When used in a WAN networking environment, the computer 902 can include a modem 960 or can be connected to a communications server on the WAN 956 via other means for establishing communications over the WAN 956, such as by way of the Internet. The modem 960, which can be internal or external and a wired or wireless device, can be connected to the system bus 908 via the input device interface 944. In a networked environment, program modules depicted relative to the computer 902 or portions thereof, can be stored in the remote memory/storage device 952. It will be appreciated that the network connections shown are examples and other means of establishing a communications link between the computers can be used.

When used in either a LAN or WAN networking environment, the computer 902 can access cloud storage systems or other network-based storage systems in addition to, or in place of, external storage devices 916 as described above. Generally, a connection between the computer 902 and a cloud storage system can be established over a LAN 954 or WAN 956 e.g., by the adapter 958 or modem 960, respectively. Upon connecting the computer 902 to an associated cloud storage system, the external storage interface 926 can, with the aid of the adapter 958 and/or modem 960, manage storage provided by the cloud storage system as it would other types of external storage. For instance, the external storage interface 926 can be configured to provide access to cloud storage sources as if those sources were physically connected to the computer 902.

The computer 902 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 10:
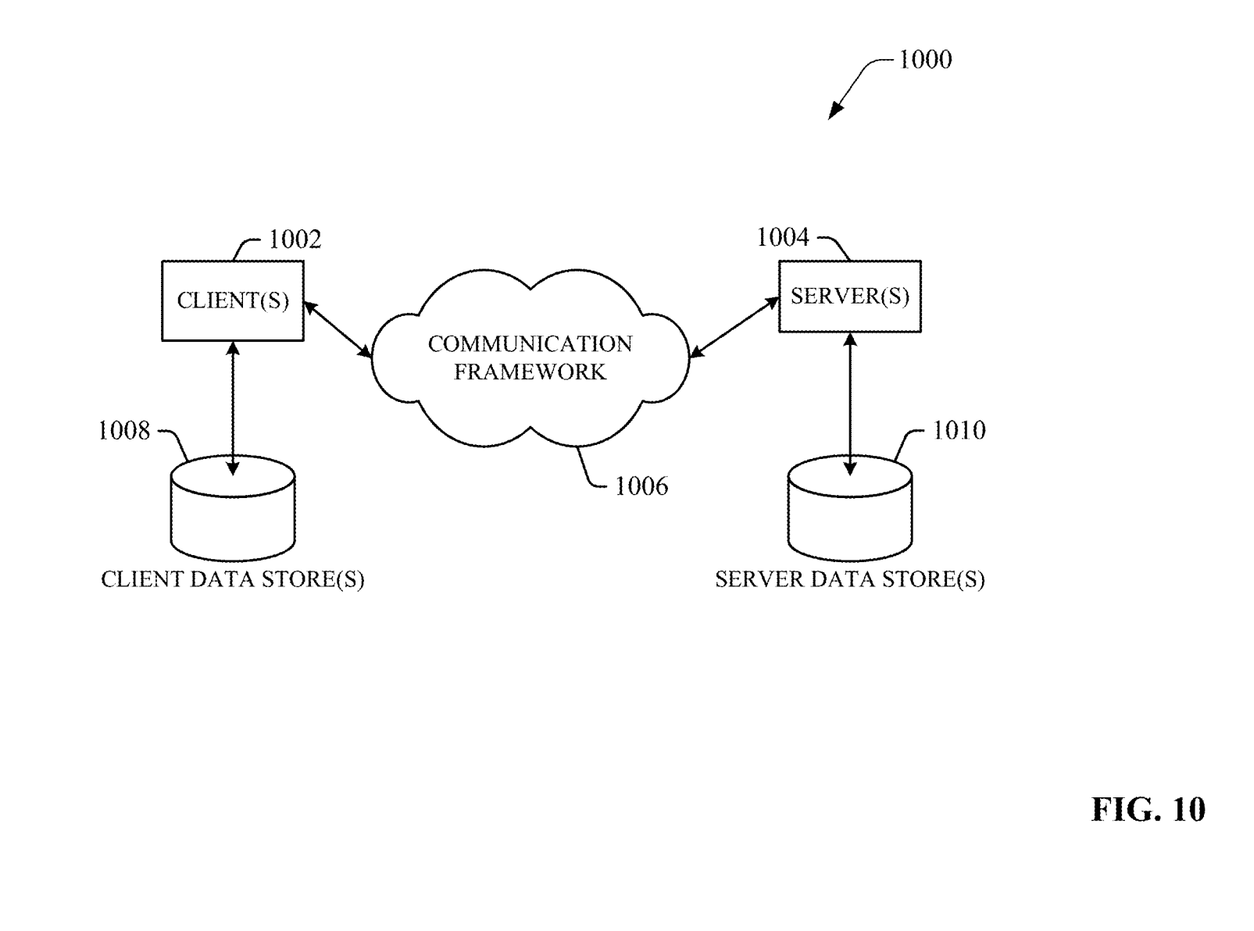
FIG. 10 is an example, non-limiting networking environment in which one or more embodiments described herein can be implemented.

Referring now to FIG. 10, there is illustrated a schematic block diagram of a computing environment 1000 in accordance with this specification. The system 1000 includes one or more client(s) 1002, (e.g., computers, smart phones, tablets, cameras, PDA's). The client(s) 1002 can be hardware and/or software (e.g., threads, processes, computing devices). The client(s) 1002 can house cookie(s) and/or associated contextual information by employing the specification, for example.

The system 1000 also includes one or more server(s) 1004. The server(s) 1004 can also be hardware or hardware in combination with software (e.g., threads, processes, computing devices). The servers 1004 can house threads to perform transformations of media items by employing aspects of this disclosure, for example. One possible communication between a client 1002 and a server 1004 can be in the form of a data packet adapted to be transmitted between two or more computer processes wherein data packets may include coded analyzed headspaces and/or input. The data packet can include a cookie and/or associated contextual information, for example. The system 1000 includes a communication framework 1006 (e.g., a global communication network such as the Internet) that can be employed to facilitate communications between the client(s) 1002 and the server(s) 1004.

Communications can be facilitated via a wired (including optical fiber) and/or wireless technology. The client(s) 1002 are operatively connected to one or more client data store(s) 1008 that can be employed to store information local to the client(s) 1002 (e.g., cookie(s) and/or associated contextual information). Similarly, the server(s) 1004 are operatively connected to one or more server data store(s) 1010 that can be employed to store information local to the servers 1004.

In one exemplary implementation, a client 1002 can transfer an encoded file. (e.g., encoded media item), to server 1004. Server 1004 can store the file, decode the file, or transmit the file to another client 1002. It is noted that a client 1002 can also transfer uncompressed file to a server 1004 and server 1004 can compress the file and/or transform the file in accordance with this disclosure. Likewise, server 1004 can encode information and transmit the information via communication framework 1006 to one or more clients 1002.

The illustrated aspects of the disclosure may also be practiced in distributed computing environments where certain tasks are performed by remote processing devices that are linked through a communications network. In a distributed computing environment, program modules can be located in both local and remote memory storage devices.

The above description includes non-limiting examples of the various embodiments. It is, of course, not possible to describe every conceivable combination of components or methods for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A. B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A system, comprising:
   at least one processor; and
   at least one memory that stores executable instructions that, when executed by the at least one processor, facilitate performance of operations, comprising:
      determining a first demodulation reference signal of a special slot of a physical uplink shared channel;
      based on the first demodulation reference signal, scheduling a second demodulation reference signal of a subsequent slot of the physical uplink shared channel, subsequent to the special slot, for uplink transmission via a user equipment common to the special slot and the subsequent slot; and
      in response to a determination that a gNodeB comprises layer one and layer two unit separation comprising a layer one receiver separated from a layer two receiver, modifying a latency limit of the layer two receiver, applicable to the layer one receiver, to be able to perform processing associated with the special slot.

2. The system of claim 1, wherein the first demodulation reference signal and the second demodulation reference signal comprise a common frequency.

3. The system of claim 1, wherein the first demodulation reference signal and the second demodulation reference signal comprise a common transmit power.

4. The system of claim 1, wherein the first demodulation reference signal and the second demodulation reference signal comprise a common antenna.

5. The system of claim 1, wherein the first demodulation reference signal and the second demodulation reference signal comprise a common time alignment.

6. The system of claim 1, wherein the second demodulation reference signal is utilized for channel estimation applicable to the special slot.

7. The system of claim 1, wherein the second demodulation reference signal comprises a sequentially-first orthogonal frequency division multiplexing symbol of the subsequent slot.

8. The system of claim 1, wherein the second demodulation reference signal comprises a sequentially third or fourth orthogonal frequency division multiplexing symbol of the subsequent slot.

9. The system of claim 1, wherein the operations further comprise:
   further in response to the determination that the gNodeB comprises layer one and layer two unit separation, sending, to the layer one receiver, an indication that the subsequent slot is able to be utilized for channel estimation for the user equipment.

10. A non-transitory machine-readable medium, comprising executable instructions that, when executed by at least one processor, facilitate performance of operations, comprising:
    determining a first demodulation reference signal of a special slot of a physical uplink shared channel;
    based on the first demodulation reference signal, scheduling a second demodulation reference signal of a subsequent slot of the physical uplink shared channel, subsequent to the special slot, for uplink transmission via a user equipment common to the special slot and the subsequent slot; and
    in response to a determination that a gNodeB comprises layer one and layer two unit separation comprising a layer one receiver and a layer two receiver, modifying a latency limit of the layer two receiver, applicable to the layer one receiver, to be able to perform processing associated with the special slot.

11. The non-transitory machine-readable medium of claim 10, wherein the first demodulation reference signal and the second demodulation reference signal comprise a common frequency.

12. The non-transitory machine-readable medium of claim 10, wherein the first demodulation reference signal and the second demodulation reference signal comprise a common transmit power.

13. The non-transitory machine-readable medium of claim 10, wherein the first demodulation reference signal and the second demodulation reference signal comprise a common antenna.

14. The non-transitory machine-readable medium of claim 10, wherein the first demodulation reference signal and the second demodulation reference signal comprise a common time alignment.

15. The non-transitory machine-readable medium of claim 10, wherein the second demodulation reference signal is utilized for channel estimation applicable to the special slot.

16. A method, comprising:
- determining, by network equipment comprising at least one processor, a first demodulation reference signal of a special slot of a physical uplink shared channel;
- based on the first demodulation reference signal, scheduling, by the network equipment, a second demodulation reference signal of a subsequent slot of the physical uplink shared channel, subsequent to the special slot, for uplink transmission via a user equipment common to the special slot and the subsequent slot; and
- in response to a determination that a gNodeB comprises unit separation between layer one and layer two respectively comprising a layer one receiver and a layer two receiver, modifying, by the network equipment, a latency limit of the layer two receiver, applicable to the layer one receiver, to be usable for processing associated with the special slot.

17. The method of claim 16, wherein the second demodulation reference signal comprises a sequentially-first orthogonal frequency division multiplexing symbol of the subsequent slot.

18. The method of claim 16, further comprising:
- further in response to the determination that the gNodeB comprises layer one and layer two unit separation, sending, by the network equipment to the layer one receiver, an indication that the subsequent slot comprises a capability to be utilized for channel estimation for the user equipment.

19. The method of claim 16, wherein the first demodulation reference signal and the second demodulation reference signal comprise a common frequency.

20. The method of claim 16, wherein the first demodulation reference signal and the second demodulation reference signal comprise a common transmit power.

* * * * *